United States Patent [19]

Meyers

[11] 4,415,234
[45] Nov. 15, 1983

[54] PASSIVE COOLING OF MIRRORS

[75] Inventor: John J. Meyers, Penfield, N.Y.

[73] Assignee: Eastman Kodak Company, Rochester, N.Y.

[21] Appl. No.: 250,476

[22] Filed: Apr. 2, 1981

[51] Int. Cl.³ .......................... G02B 5/08; G02B 7/18
[52] U.S. Cl. ............................................... 350/310
[58] Field of Search ............................... 350/310, 288

[56] References Cited

U.S. PATENT DOCUMENTS 3,582,190 6/1971 Smith .................................. 350/310
4,053,241 10/1977 Simmons et al. .................... 350/310

FOREIGN PATENT DOCUMENTS 2215631 8/1974 France ............................... 350/310

Primary Examiner—Jon W. Henry
Attorney, Agent, or Firm—J. A. Morrow

[57] ABSTRACT

Heat-absorbing phase-change materials are contained in voids provided in the substrate of a mirror to provide passive cooling. This arrangement for passive cooling of mirrors has been found especially suitable for composite mirrors used in high thermal energy laser and similar applications.

4 Claims, 1 Drawing Figure

PASSIVE COOLING OF MIRRORS

BACKGROUND OF THE INVENTION

1. Field of the Invention

The present invention relates to mirrors and more specifically to passive cooling of mirrors for high thermal energy applications.

2. Description of the Prior Art

As exemplified by the disclosures of U.S. Pat. Nos. 3,841,469 and 4,221,469, high thermal energy mirror systems typically require extensive cooling apparatus to perform under high thermal flux loads. Pumping of fluids through passages in laminated plates or through a substrate between the faceplate and the backplate has been successfully used with such mirror cooling systems. However, because of the attendant size and weight and the mechanical/hydraulic vibrations imposed by the conventional cooling apparatus, mirror systems incorporating such apparatus are generally not fully satisfactory for space and airborne systems which impose exceptional reliability, weight constraints, and stability requirements.

As alternative means for cooling of mirrors, other prior art disclosures discuss filling voids in the substrates of mirrors with selected thermal conductive materials, such as copper, which conduct heat to an external heat sink. The additional weight and increased physical dimensions resulting from such a cooling arrangement also makes these mirrors unsatisfactory for some purposes.

Heat-absorbing, phase-change materials such as gallium and/or a variety of clathrates are known for their characteristic ability to absorb great amounts of heat energy because of their high phase-change heat of fusion. However, the use of phase-change materials for cooling high-energy mirror systems has not been disclosed in the known prior art. The placement of phase-change materials in voids or chambers defined in mirror substrates conveniently permits mirrors to be of compact physical dimensions while providing high reliability and desired thermal characteristics.

SUMMARY OF THE INVENTION

In accordance with the present invention, a high thermal energy mirror system suitable for laser applications is provided with passive cooling by incorporating a heat-absorbing, phase-change material such as gallium or a clathrate in voids or chambers in the mirror substrate. Such passive cooling provides high reliability by eliminating the necessity for the mirror system to include conventional coolant circulating components such as pumps, pipes, and regulators. Size and weight advantages have been realized in mirror systems including the passive cooling features of the present invention.

DETAILED DESCRIPTION OF THE INVENTION

Figure 1:
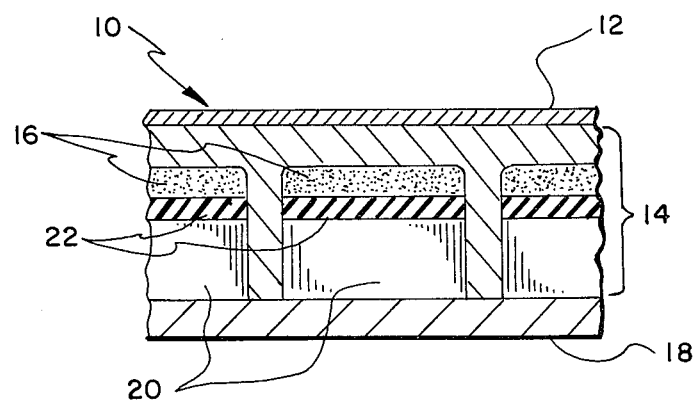
FIG. 1 is a schematic drawing of a portion of a mirror including passive cooling features in accordance with the present invention.

Referring now to the drawings, a preferred embodiment of the present invention comprises a composite mirror 10 including an optically reflective cladding 12 supported by a suitable faceplate or substrate 14. To provide passive cooling, selected phase-change materials 16 are contained in voids or chambers 20 defined in the substrate. Composite mirrors including substrates of carbon-carbon or conventional materials and including passive cooling features of the present invention are especially suitable for applications wherein the mirrors are subjected to high temperature gradient and high thermal shock. Features of the composite mirrors having a carbon-carbon substrate are described more fully in commonly-assigned, copending U.S. Patent Application Ser. No. 250,475, entitled Composite Mirror And Method Of Construction, filed Apr. 2, 1981, in the name of J. J. Meyers et al., the disclosure of that Application being specifically incorporated herein by reference.

PREPARATION OF MIRROR SUBSTRATES

To contain the phase-change materials in the mirror substrates, narrow hexagonal, diamond-shaped, and square trenches have been machined into the rear surface of mirror faceplates using conventional machining techniques. Other methods of creating voids or chambers 20 in the substrates 14 for containing the phase-change materials 16 are within the skill of the art. Other than limitations which are presented by conventional methods of preparation of chambers in the substrates, the only practical limitation imposed is the maintainance of the desired physical stiffness of the selected substrates. To provide required mechanical stiffness and to limit thermal distortions, I have found it desirable in some instances to attach solid or web-cored backplates 18. The use of backplates and other such mirror constructions is well known. If desired, laminated mirror structures may be used to include phase-change materials in the substrate. The laminations may be secured together by means well known in the art to form a unitary mirror structure.

Depending upon the thermal expansion characteristics of the materials comprising the mirror and the selected phase-change material, it may be necessary, or desirable, to fill the chambers in the mirror substrate with less than a full capacity of phase-change material. In such instances, maximum heat transfer from the mirror to the phase-change material may require a compliant seal to maintain thermal contact between the mirror and the phase-change material. I have found that a seal barrier 22 of General Electric RTV-60 material may be suitably used to maintain the phase-change material directly in contact with the mirror in a heat-transferring relation. Other similar silicone base and rubber materials would also be applicable. The selection of the material for the seal barrier, if required, depends upon the exact applications and the selection from known materials is deemed within the skill of the art.

Preparation of the substrates to include phase-change media can be successfully employed for all mirrors including those less than one meter in diameter. However, the necessary thickness of phase-change media and restrictions of heat-transfer conductance imposed on the smaller mirrors can possibly limit the quantity of the included phase-change media to a single thermal cycle. In using mirrors which include a limited quantity of phase-change material, it may be necessary, following each heat cycle, to have the phase-change material reconditioned or solidified by cooling with conventional cooling techniques and devices. Heat pipes or other heat conductors may be used to assist in removing the heat of fusion to a cooled heat sink for the reconditioning. In the case of larger mirrors, it is possible to include enough phase-change media in the substrate for many repetitive thermal cycles at close enough intervals to preclude effective ambient cooling without the need for reconditioning between the thermal pulses. Again, the quantity of phase-change material included will determine the number of thermal cycles to which the mirror can be exposed before reconditioning of the phase-change material is necessary.

SELECTION OF PHASE-CHANGE MATERIALS

It is required that the phase-change material selected for passive cooling of a mirror have a melting point slightly above the highest ambient temperature at which the mirror will be used. To avoid a large mirror-temperature change before melting begins, it is also desirable that the ambient mirror temperature be maintained at a temperature just slightly below the meltpoint of the phase-change medium. In addition to an appropriate and repeatable melt point, the appropriate phase-change material should have a high heat of fusion, a low expansion during the change of state, high thermal conductivity in both states, a high breakdown temperature, and low corrosivity and toxicity.

Several phase-change materials having desired characteristics are available. Two phase-change materials which I have used successively include the clathrate tetrabutylammonium fluoride with a melt point of 25° C. and the metal gallium with a melt point of 29.8° C. Comparison of the known properties has indicated that gallium may be preferred even though it is considerably more expensive. While the heat of fusion of gallium is only one-third that of the above-identified clathrate, the volume requirements for a given heat loading are less because its density is almost six times higher; also, its conductivity and its degradation temperature are much higher. Accordingly, mirrors designed with gallium as the phase-change medium can be used in systems having higher heat-flux loading and will operate for a greater number of repetitive heating cycles. Neither material is corrosive or toxic.

Alternative clathrates are also known, including tetrabutylammonium chloride, which melts at 10° C., and tetra-N-butylammonium butyrate, which melts at 29.4° C. Other phase-change materials include myristic acid, which melts at 51.7° C., and various petroleum base compounds and waxes. Materials such as Glauber's Salt ($Na_2SO_4.10H_2O$), which melts at approximately 32.2° C., can also be used as phase-change materials. It has been recognized that use of some of these alternative materials may be limited because their melt points are not precise and repeatable. The exact selection of phase-change material may, in fact, result in a compromise selection in which the selected material or composite material appears best to optimize the most critical requirements.

TESTING OF PASSIVE COOLING CONCEPTS

Experimental thermal tests have been conducted to verify the general validity of the phase-change approach to thermal control. In one test, a four-cell section of a fused silica mirror was provided with tetrabutylammonium fluoride as the phase-change material. In another test, this same mirror section was not so modified. In both tests, the mirror was monitored through attached thermocouples and thermal profiles were recorded within the mirror faceplate and backplate.

In testing, simulated laser thermal loads were induced on the test mirror by seven 40-second heat load pulses introduced at 15-minute intervals. When tested without the clathrate phase-change material, the mirror temperature cascaded upwards with each heat cycle. When tested with the clathrate, the clathrate effectively absorbed all of the heat introduced into the mirror for the first six pulses. At pulse seven the clathrate was totally melted, as as previously predicted by thermal analysis, and was unable to absorb the thermal pulse. The temperatures then began to cascade upward as in the previous test without the clathrate, but at a lesser rate owing to the additional heat capacity afforded by the clathrate.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

I claim:

1. A mirror for high thermal energy application comprising:
   (a) a substrate including means defining a chamber therein;
   (b) gallium contained in said chamber; and
   (c) an optical coating of high reflectivity supported by said substrate.

2. A mirror for high thermal energy application comprising:
   (a) a substrate including means defining a chamber therein;
   (b) tetrabutylammonium fluoride contained in said chamber; and
   (c) an optical coating of high reflectivity supported by said substrate.

3. A mirror comprising:
   a substrate having a first surface and having means defining a chamber;
   an optical coating of high reflectivity supported by said first surface;
   gallium contained in said chamber; and
   means for sealing said gallium in said chamber.

4. A mirror for high thermal energy application comprising:
   (a) a substrate including means defining a chamber therein;
   (b) an optical coating of high reflectivity supported by said substrate; and
   (c) a phase-change material selected from a group of materials consisting of gallium, tetrabutylammonium fluoride, tetrabutylammonium chloride, tetra-N-butylammonium butyrate, myristic acid, and Glauber's Salt, said selected material being contained in said chamber for cooling said optical coating as the selected material changes from solid phase to liquid phase.

* * * * *